(12) United States Patent
McCoy et al.

(10) Patent No.: US 10,401,791 B2
(45) Date of Patent: Sep. 3, 2019

(54) HOLOGRAPHIC DISPLAY SCREEN

(71) Applicant: Sony Interactive Entertainment LLC, San Mateo, CA (US)

(72) Inventors: Charles McCoy, San Mateo, CA (US); True Xiong, San Mateo, CA (US); Blaine Morgan, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/689,688

(22) Filed: Aug. 29, 2017

(65) Prior Publication Data

US 2019/0064734 A1    Feb. 28, 2019

(51) Int. Cl.
*G03H 1/00* (2006.01)
*G02B 5/32* (2006.01)
*G03H 1/02* (2006.01)

(52) U.S. Cl.
CPC ............. *G03H 1/0005* (2013.01); *G02B 5/32* (2013.01); *G03H 1/02* (2013.01); *G03H 2001/0088* (2013.01)

(58) Field of Classification Search
CPC .................. G03H 1/0005; G03H 1/02; G03H 2001/0088; G02B 5/32; G02B 26/0841; G02B 26/0833
USPC ................................ 359/15, 290–292, 223.1
See application file for complete search history.

(56) References Cited

U.S. PATENT DOCUMENTS

| | | | | | |
|---|---|---|---|---|---|
| 6,817,723 | B1 * | 11/2004 | May | ..................... | H04N 5/7416 345/207 |
| 6,914,711 | B2 * | 7/2005 | Novotny | ............ | G02B 26/0841 359/224.1 |
| 7,116,463 | B2 * | 10/2006 | Wu | .......................... | G02B 5/32 359/291 |
| 2003/0071813 | A1 * | 4/2003 | Chiabrera | ............ | G02B 27/225 345/426 |

* cited by examiner

*Primary Examiner* — Tuyen Tra
(74) *Attorney, Agent, or Firm* — John L. Rogitz

(57) ABSTRACT

In one aspect, each pixel of a holographic display screen emits light in a narrow angle, and micro-mirrors control the angle in which the light is emitted. The light that is emitted is modulated so that the image for the left eye is emitted when the pixel is pointed by means of its micro mirror at a viewer's left eye and light for the image for the right eye is emitted when the pixel is pointed at the viewer's right eye.

18 Claims, 6 Drawing Sheets

Display

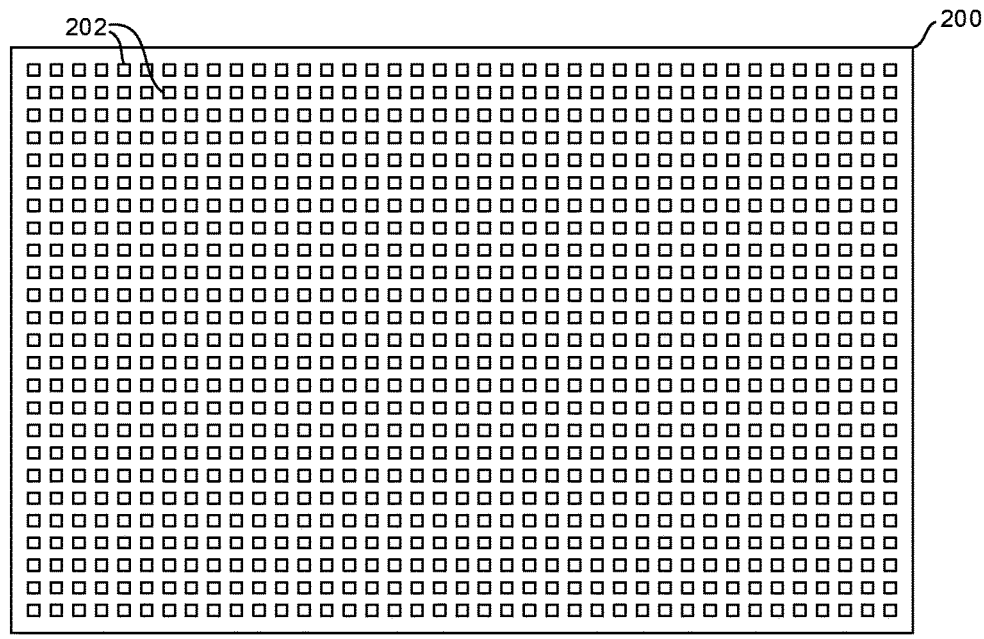
FIG. 2  Display
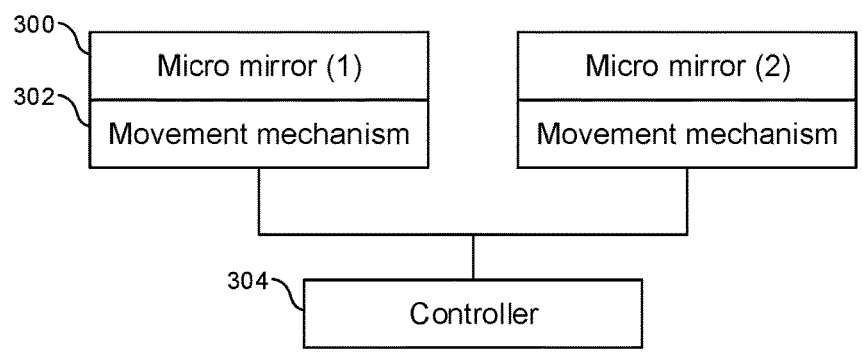
FIG. 3

FIG. 4  Cross section of two pixel elements

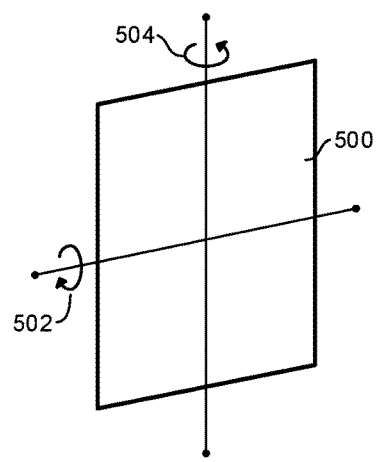
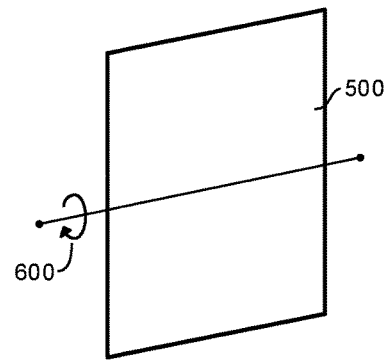
FIG. 5
FIG. 6
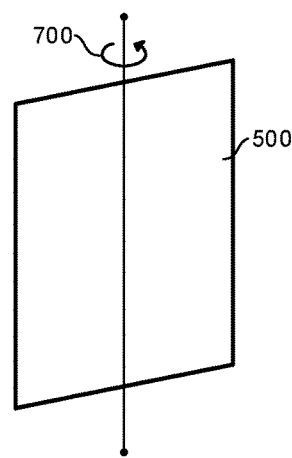
FIG. 7

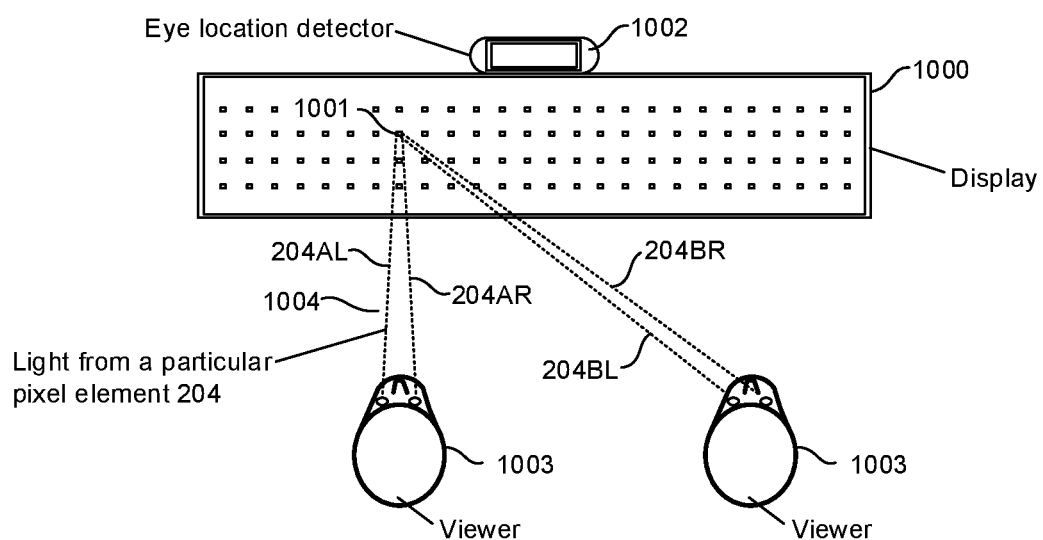
FIG. 10 Overview showing display and two viewers

HOLOGRAPHIC DISPLAY SCREEN

FIELD

The application relates to systems and methods for holographic display screens.

BACKGROUND

Three-dimensional (3D) video is enjoying acceptance in many fields, including in computer games and movies. As understood herein, many 3D video systems require viewers to wear 3D glasses, which raise several drawbacks including comfort, convenience, and cost.

SUMMARY

Accordingly, present principles are directed to a holographic display which presents 3D images without the need for 3D eyewear on the part of the viewers.

In one aspect, an apparatus includes at least one display and plural pixel elements on the display for presenting demanded images. At least one-pixel element includes a first light emitter and at least one micro mirror positioned and movable to direct light from the first emitter outwardly from the display at a first time, and to direct light outwardly from the display at a second time at a different angle than light is directed at the first time.

In some examples, a second emitter may be provided, and the micro mirror can be movable to alternate directing light between the first and second emitters. The apparatus may include at least one processor configured with executable instructions for controlling the micro mirror. The instructions may be executable for controlling the micro mirror at least in part based on eye tracking of at least one viewer. In some examples, the instructions can be executable for controlling the micro mirror at least in part based on eye tracking of plural viewers. Present principles can also be used to deliver a first demanded 2D image to a first viewer and a second demanded 2D image to a second viewer. Additionally, present principles can be used to deliver a demanded 2D image to a first viewer and a demanded 3D image to a second viewer.

In some implementations, the micro mirror is movable in one dimension only. In other implementations, the micro mirror is movable in two dimensions.

In non-limiting example embodiments, the micro mirror can be elongated and can reflect light for plural pixels in a row or column of a matrix display.

In another aspect, a method includes using a first emitter, directing light against a micro mirror oriented in a first orientation. The method also includes using a second emitter, directing light against the micro mirror oriented in a second orientation.

In another aspect, an apparatus includes at least one computer storage that is not a transitory signal and that in turn includes instructions executable by at least one processor to, for each of a plurality of pixel elements of a display, orient a respective micro mirror. The instructions are executable to, for each of the plurality of pixel elements, activate a respective first emitter to transmit light against the micro mirror to establish a left eye component of a demanded three-dimensional (3D) image. The instructions are further executable to, for each of the plurality of pixel elements, move the respective micro mirror, and for each of the plurality of pixel elements, activate the first emitter or a respective second emitter to transmit light against the micro mirror to establish a right eye component of the demanded 3D image.

In example embodiments of this latter aspect, the instructions can be executable to move the micro mirrors and activate the emitters to establish left and right eye components of a first frame of the demanded 3D image for a first viewer, and also move the micro mirrors and activate the emitters to establish left and right eye components of the first frame of a demanded 3D image for a second viewer. The instructions are executable to, after establishing the left and right eye components of the first frame of the demanded 3D image for the second viewer, move the micro mirrors and activate the emitters to establish left and right eye components of a second frame of the demanded 3D image for the first viewer. The demanded 3D image for the first viewer may be the same as the demanded 3D image for the second viewer, or the demanded 3D image for the first viewer may not be the same as the demanded 3D image for the second viewer.

In other example embodiments, the plurality of pixel elements is a first plurality. The instructions are executable to move the micro mirrors and activate the emitters to establish left and right eye components of the demanded 3D image for a first viewer, and for a second plurality of pixel elements, move the micro mirrors of the second plurality and activate the emitters of the second plurality to establish left and right eye components of the first frame of a demanded 3D image for a second viewer.

In some implementations, the instructions can be executable to move the micro mirrors at least in part based on eye tracking of a viewer. The instructions may be executable to modify the 3D image based at least in part on a relationship between a head of a viewer and the display. Facial recognition can be used in conjunction with the eye tracking of a viewer to identify the identity of the viewer or viewers that the images are being displayed to.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of a display with pixel elements consistent with present principles;

FIG. 3 is a block diagram of two micro mirrors being controlled by a controller;

FIGS. 5-7 are schematic diagrams illustrating various degrees of freedom of motion for the micro mirrors;

FIG. 10 is a schematic diagram of a display with eye tracking capability.

DETAILED DESCRIPTION

Figure 1:
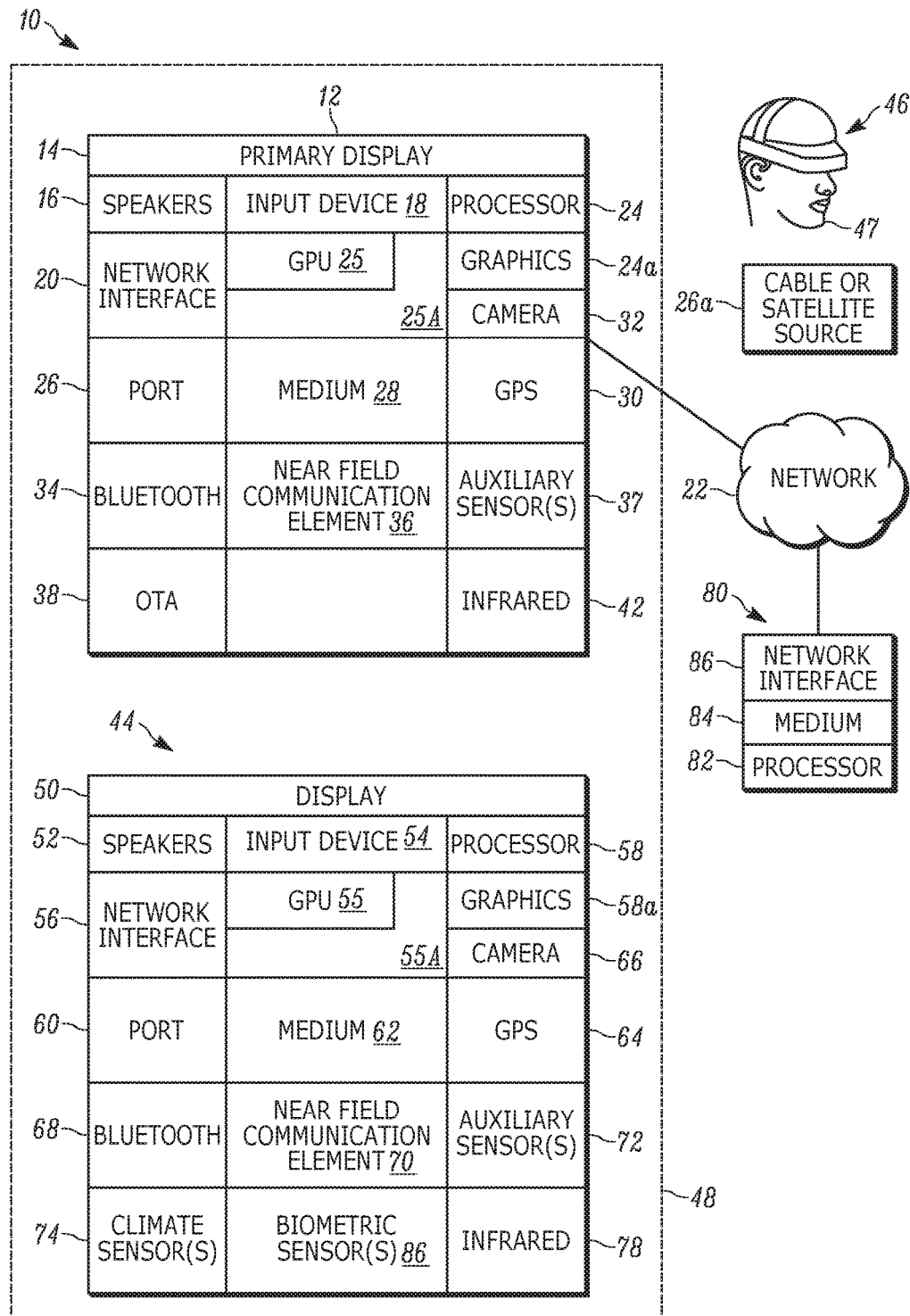
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

In general, as disclosed in greater detail below, each pixel of a display emits light in a narrow angle, and micro-mirrors control the angle in which the light is emitted. The light that is emitted is modulated so that the image for the left eye is emitted when the pixel is pointed at a viewer's left eye and light for the image for the right eye is emitted when the pixel is pointed at the viewer's right eye.

In variations, the mirror for each pixel can aim the light both horizontally and vertically, i.e., the mirror can move in both the elevational and azimuthal dimensions. In other embodiments, the mirror for each pixel can aim the light only in one dimension. The dimension the mirror aims in can be oriented horizontally (azimuthally) in a display that is viewed by viewers in an upright position so that the mirror is in a different position when it is aimed at each of the viewers' eyes. The light emitted may be across a wide viewing angle in the dimension perpendicular to the movement of the mirror and can be across a very narrow viewing angle in the dimension the mirror aims in. In other words, the emitted light can be narrow in the azimuthal dimension but broad in the elevational dimension, and vice-versa. In some implementations, a separate mirror may be used for each pixel, and in some implementations a long narrow mirror can be used for a whole row of pixels. Alternatively, separate display pixels can be used for the left eye and the right eye, eliminating the need to modulate the pixel output.

A viewer may have to align his head to the display to see the image being emitted. In some embodiments pairs of stereoscopic images are displayed in multiple directions so that the image can be viewed by multiple viewers simultaneously. A plurality of different images may be displayed to the multiple viewers simultaneously. In some embodiments, instead of having a single left image and a single right image, a series of more than two images are displayed, allowing viewers to move their heads side to side to see different pairs of images from the series of images. The above features may be combined with eye tracking to allow the same image to be consistently displayed to the viewer as his head moves in relation to the display. The relationship of the viewer's head to the display can be used to alter the image that is displayed to the viewer, such as looking around an object that is close to the viewer for, e.g., rendering a virtual reality game.

With the above in mind, attention is now drawn to FIG. 2, which illustrates a display 200 that may be used for any of the displays above. The display 200 includes a matrix of pixel elements 202.

FIG. 3 illustrates first and second micro mirrors 300 for respective pixel elements 202, which are described further below. Each micro mirror 300 typically is independently moved in one or two dimensions by a respective movement mechanism 302, with the mechanisms 302 being controlled by a controller 304 such as the processor of the display or another processor. The mechanisms 302 may be, e.g., electrostatic or flexure control mechanisms. Digital micro mirror device (DMD) and/or micro electro mechanical system (MEMS) principles may be used.

Figure 4:
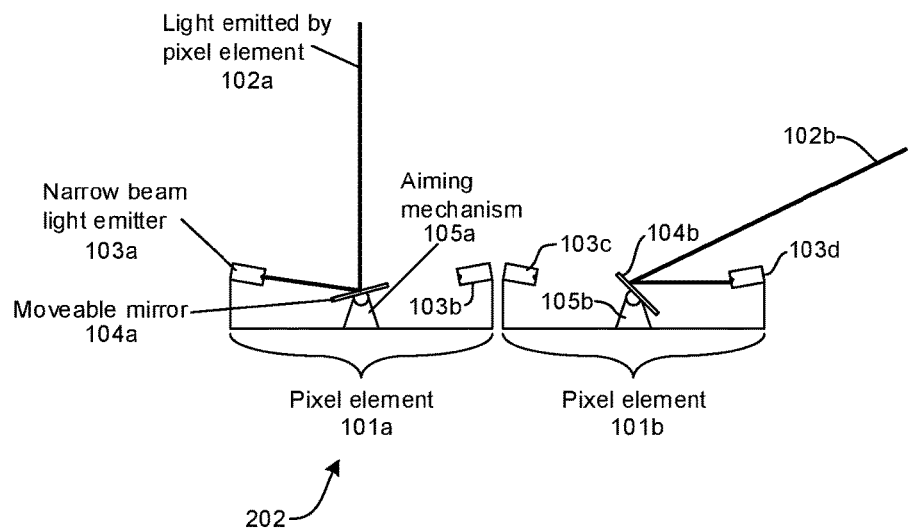
FIG. 4 is a schematic diagram of two-pixel elements, each of which is shown with two light emitters and one micro mirror, with the pixel elements being shown using different light emitters and mirror angles to show how different light emitters can be used based on the angle of the mirror and the desired angle in which the light should be emitted.

FIG. 4 illustrates two example pixel elements 202, labeled 101a and 101b in FIG. 4. A pixel element emits a single beam of light in a single direction. In the example shown and taking the left pixel element 101a as an example, the pixel element can be associated with left and right emitters 103a, 103b that aim a narrow band of light at a micro mirror 104a. Only one emitter 103a, 103b at a time emits light, with the micro mirror 104a being moved toward the currently emitting emitter and angled as appropriate to direct the single beam of light outward, in some cases as controlled by eye tracking of a viewer.

Thus, a processor executing instructions can control whether a single pixel element is modulated to display both a left and right image or whether separate display pixel elements are used to display the left and right portions of a single image pixel. Similarly, the processor executing software controls whether display pixels are modulated to display images to multiple viewers, or if separate display pixels are used to display images to multiple viewers. The display pixels shown in FIG. 4 are shown with multiple emitters, which allows for different emitters to be used for different angles that the light is emitted, allowing the pixel to cover a wider range of angles.

In some implementations, only a single light emitting element (or set of colored light emitting elements) is included in each pixel. This has the tradeoff that at more extreme viewing angles the width and/or direction of the emitted light beam may be less precisely controlled as the angle of the light striking the mirror is more extreme.

In an alternate implementation, a single light emitter (or set of colored light emitters) 103 can be attached to the mirror 104 for each pixel, eliminating the need for multiple light emitters to cover a wide range of angles. In another alternative implementation, the light emitter 103 can be mounted directly on the aiming mechanism 105, eliminating the need for multiple light emitters 103 and the mirror 104. These implementations have the trade-off that the light emitter 103 may have more mass than the mirror 104, and therefore require more force by the aiming mechanism 105 to position as quickly. Also, the electrical signal to drive the light emitter preferably is transmitted to the light emitter through its full range of motion.

By rapidly changing the angle of the mirror 104a by means of its mounting or motion mechanism 105a, the pixel element can emit multiple beams in multiple directions, such as a first beam to a left eye and a second beam to a right eye. If done rapidly enough, the intermittent presence of each beam is perceived as continuous by a human observer. Such an implementation may be used to provide separate beams to each eye of a plurality of viewers. In some implementations, separate pixel elements are used to provide separate beams. Such an implementation has the advantages that the mirror 104a only needs to move enough to track the changes in the beam direction, and that the emitted beam is continuous, so that the light emitters 103 do not need to switch between beams. Such an implementation has a tradeoff in that more pixel elements are needed to provide the same number of image pixels especially as the number of viewers increases.

In FIG. 4, reference numeral 102a denotes light emitted by the pixel element 101a, which is a narrow directional beam. For illustration, in FIG. 4 the pixel element 101a is shown with a mirror alignment that projects the beam 102a straight out, whereas the pixel element 101b is shown with its mirror alignment projecting its beam 102b at an angle significantly off of the axis that beam 102a is projected. Note that the right hand light emitter 103d is used to achieve the angle that the beam 102b from the right-hand pixel element 101b is emitted along without the light impinging on the mirror 104b of the right-hand pixel element 101b at an extreme angle, which otherwise could make it more difficult to aim and to maintain a narrowly focused beam.

The light emitters 103a-d are narrow beam light emitters that emit a narrow beam of light toward the respective mirrors 104a-b that corresponds to the brightness that the light beam should be in the direction that the beam is aimed. In some implementations, the light emitters can include red, blue, and green light in a single beam, with the intensity of each bandwidth of light controlled independently. This has the advantage that fewer pixel elements are needed, but the implementation of each light emitter is more complex. In some implementations, each light emitter produces only a single controllable bandwidth. Such an implementation can be used to produce a color image by having light emitters 103 for each of the red, blue, and green bandwidths. In some implementations separate pixel elements 101 are used for each bandwidth of each image pixel. In some implementations, a single pixel element 101 may contain a plurality of light emitters 103 with different light emitters outputting different bandwidths. The pixel element alternates between light emitters of different bandwidths.

It may now be appreciated that the movable micro mirrors 104a, 104b can be used to direct the beam of light from one of the emitters of the pixel element at a time. In some implementations, the micro mirrors alternate between a plurality of beams that are emitted by the pixel element. The plurality of beams may be generated by a single light emitter 103, or may be generated by a plurality of light emitters 103. The light emitter used for a beam may change as the angle of the beam changes.

FIG. 5 shows a micro mirror 500 consistent with present principles that can move in two dimensions, in the example shown, in both the elevational dimension about a horizontal axis as indicated by the arrow 502, and the azimuthal dimension about a vertical axis as indicated by the arrow 504. In FIG. 6 the micro mirror 500 is movable only in the elevational dimension as indicated by the arrow 600, whereas in FIG. 7 the micro mirror 500 is movable only in the azimuthal dimension as indicated by the arrow 700.

Figure 8:
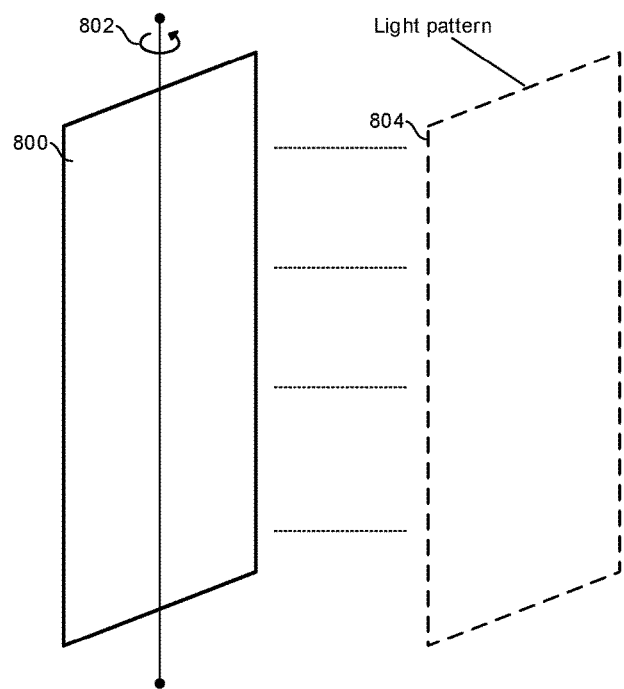
FIG. 8 is a schematic diagram illustrating an elongated micro mirror for use with a row or column of pixels.

FIG. 8 shows an elongated micro mirror 800 that is longer in the vertical dimension than it is wide in the horizontal dimension, for rotation about a vertical axis as indicated by the arrow 802 to direct an azimuthally narrow, elevationally long light pattern 804 toward a viewer. The configuration of FIG. 8 may be used to use a single micro mirror for a row of pixels, it being understood that the orientation in FIG. 8 can be rotated ninety degrees to use a single micro mirror for a column of pixels.

Figure 9:
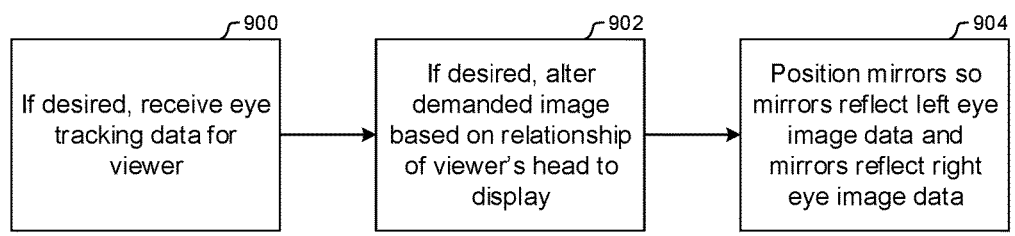
FIG. 9 is a flow chart of example logic consistent with present principles.

FIG. 9 shows example logic consistent with present principles. At block 900, if desired eye tracking information, including, if desired, facial recognition, may be received for one or more viewers. An example eye tracking system is shown in FIG. 10 and discussed below. Moving to block 902, if desired, the demanded image that is to be projected is altered based on the relationship of the viewer's head to the display. For example, the demanded image may be altered to make it appear, based on the viewer's eye position and distance/orientation to the display, that the viewer is looking around an object that is closer in the foreground of the image to the viewer for, e.g., rendering a virtual reality game.

In any case, at block 906 the micro mirrors are positioned so that at a first time, they reflect light from the respective left emitter of the respective pixel element and at a second time they reflect light from the respective right emitter of the respective pixel element, to achieve a holographic (3D) effect. To this end the mirrors are positioned according to eye tracking if used in block 900 to project an image, altered by block 902 if desired, alternatingly in quick succession toward the left eye and then right eye of a viewer. The mirrors may be further synchronized when there are multiple viewers to reflect light first toward the left eye of a first viewer, then the left eye of a second viewer, then the right eye of the first viewer, then the right eye of the second viewer, and this may be extended to account for multiple viewers. This principle may be further extended by causing the demanded image sent to the emitters to be a first movie, for example, for the first viewer and a second movie for the second viewer.

Positioning done by block 906 may also use separate display pixels for left and right eyes and/or for different viewers instead of modulating the output of a single display pixel. Note that software instructions represented by block 906 that control whether modulation or separate pixels are used. In some implementations, a display device can have different modes to allow the user to choose between the use of modulation or separate pixels. Additionally, the positioning done by block 906 can display a 2D image to both the left and right eye of a viewer. In some implementations, a first 2D image is displayed to a first viewer while a second 2D image is displayed to a second viewer. In some implementations, a 2D image is displayed to a first viewer while a 3D image is displayed to a second viewer. This can be used to allow multiple viewers to view different programming at the same time on the same display screen. This can also be used to allow different viewers to see different views of the same game at the same time when playing a video game.

FIG. 10 illustrates a display 1000 made up of a matrix of pixel elements 1001 to display an image. The number of pixel elements used for each image pixel depends on the implementation. An eye location detector 1002 may be mounted on or otherwise juxtaposed with the display 1000 to detect the locations of viewer's eyes relative to the display 1000. In some implementations, the eye location detector is built into the unit housing the display. In some implementations, the eye location detector is implemented as a single camera. In some implementations, the eye location detector uses multiple cameras. This has the advantage that eyes that are obstructed from some angles, such as a viewer wearing a hat with a brim, can be detected by a camera at a different angle. This also has the advantage that triangulation can be used to determine the distance to a viewer's eyes. In some implementations, the sensors that are part of the eye location detector are built into the matrix of the display 1000. In some implementations, the sensors for the eye location detector are located behind the pixel elements of the display 1000. In such an implementation, the sensors detect light passing between pixel elements and/or light passing through pixel elements that did not strike a component of the pixel element. Note that if desired the eye detector 1002 may perform facial recognition. In other implementations, a separate detector (not shown) may be used to perform facial recognition. One advantage of using facial recognition is that in a game displaying separate images to player 1 and player 2, if the players leave the range of the eye detector 1002 and then return, the facial recognition information can be used to determine with viewer is player 1 and which viewer is player 2 to ensure that each viewer is again shown the correct images.

Incorporating the sensors into the display 1000 or behind it has the advantage that the eye detection is closer to the axis of the direction in which the viewer is looking. It also has the advantage that no detector elements need to be located outside of the display surface. This allows for more aesthetic choices when designing the display housing and allows for implementations without a bezel around the display, such as in a modular display wall. In some implementations, the eye location detector can detect which portion of the display that the display 1000 that each viewer is looking at.

In addition to eye tracking the location detector may detect gestures by the user, such as blinks, winks and head nods. The gesture detection may be expanded to the whole user to allow hand gestures to be detected, or even to detect sign language performed by the user.

In some implementations, the eye location detector emits light that it used to detect the location of user's eyes. This has the advantage that the location of the user's eyes can be detected even in a dark room when the display is outputting dark implementation. In most of these implementations the bandwidth of the light that is emitted is outside of the bandwidth that can be seen by humans, such as infrared, ultraviolet, or even higher wavelengths such as radar. This has the advantage that the emitted light is not visible to the users and does not detract from their viewing of the display.

In some implementations, the light emitted by the eye location detector 1002 is pulsed and the eye location detector determines the timing of that light bouncing off the user and making it back to the eye location detector. This timing can be used to determine the distance to the user. This timing may be determined by the main sensors of the eye location detector or may be determined by specialized sensors in the eye location detector. The resolution of the specialized sensors may differ from the resolution of the main sensors. For example, the specialized sensors may have a minimal resolution needed to determine the distance to each head while the main sensor could have a higher resolution to allow it to do eye tracking.

In the example shown, two viewers 1003 are viewing the display 1000. FIG. 10 shows light 1004 emitted by a pixel element, it being understood that each pixel element likewise emits light. Four beams from a single pixel are shown in the diagram, each directed to a different eye of a viewer 1003. Thus, beams the 204AL and 204AR form a stereoscopic pair of images for the left-hand viewer in FIG. 10 while the beams 204BL and 204BR form a stereoscopic pair of images for the right-hand viewer in FIG. 10.

In some implementations all four beams 204AL, 204AR, 204BL, and 204BR are emitted by the same pixel element. In some implementations, however, more than one-pixel element may be used to generate the plurality of beams. This has the disadvantage that more pixel elements are needed for the same number of image pixels. If separate pixel elements are used for each viewer, then the image resolution that can be supported will be reduced as more viewers simultaneously view the display. The advantages of using a plurality of pixel elements are that the speed and distance that the mirror has to travel is reduced, and that percentage of time that beam is aimed at each eye is increased, allowing greater brightness for the same light emitter output level.

It will be appreciated that whilst present principals have been described with reference to some example embodiments, these are not intended to be limiting, and that various alternative arrangements may be used to implement the subject matter claimed herein.

What is claimed is:

1. An apparatus comprising:
    at least one display;
    plural pixel elements on the display for presenting demanded images, at least one pixel element comprising:
    a first light emitter;
    at least one micro mirror positioned and movable to direct light from the first emitter outwardly from the display at a first time and to direct light outwardly from the display at a second time and in a different direction than light is directed by the micro mirror at the first time; and
    at least one processor configured with executable instructions for controlling the micro mirror, wherein the instructions are executable for controlling the micro mirror at least in part based on eye tracking of at least one viewer.

2. The apparatus of claim 1, comprising a second light emitter, wherein the micro mirror is movable to alternate directing light between the first and second emitters.

3. The apparatus of claim 1, wherein the micro mirror is movable in one dimension only.

4. The apparatus of claim 1, wherein the micro mirror is movable in two dimensions.

5. The apparatus of claim 1, wherein the micro mirror is elongated and reflects light for plural pixels in a row or column of a matrix display.

6. The apparatus of claim 1, wherein the instructions are executable for controlling the micro mirror at least in part based on eye tracking of plural viewers.

7. A method, comprising:
    using a first emitter, directing light against a micro mirror oriented in a first orientation to reflect the light from the first emitter against a portion of an object; and
    using a second emitter, directing light against the micro mirror oriented in a second orientation to reflect the light from the second emitter against a portion of the object, the first emitter being different from the second emitter.

8. The method of claim 7, wherein the first and second emitters and the micro mirror establish a first pixel element n an array of pixel elements operable to produce a demanded image.

9. The method of claim 8, wherein the demanded image is a holographic image.

10. An apparatus, comprising:
    at least one computer storage that is not a transitory signal and that comprises instructions executable by at least one processor to:
    for each of a plurality of pixel elements of a display, orient a respective micro mirror;
    for each of the plurality of pixel elements, activate a respective first emitter to transmit light against the micro mirror to establish a left eye component of a demanded three-dimensional (3D) image;
    for each of the plurality of pixel elements; move the respective micro mirror; and
    for each of the plurality of pixel elements, activate the first emitter or a respective second emitter to transmit light against the micro mirror to establish a right eye component of the demanded 3D image.

11. The apparatus of claim 10, wherein the instructions are executable to:
    move the micro mirrors and activate the emitters to establish left and right eye components of a first frame of the demanded 3D image for a first viewer;
    move the micro mirrors and activate the emitters to establish left and right eye components of the first frame of a demanded 3D image for a second viewer; and
    after establishing the left and right eye components of the first frame of the demanded 3D image for the second viewer, move the micro mirrors and activate the emitters to establish left and right eye components of a second frame of the demanded 3D image for the first viewer.

12. The apparatus of claim 11, wherein the demanded 3D image for the first viewer is the same as the demanded 3D image for the second viewer.

13. The apparatus of claim 11, wherein the demanded 3D image for the first viewer is not the same as the demanded 3D image for the second viewer.

14. The apparatus of claim 10, wherein the plurality of pixel elements is a first plurality, and the instructions are executable to:
    move the micro mirrors and activate the emitters to establish left and tight eye components of the demanded 3D image for a first viewer; and
    for a second plurality of pixel elements, move the micro mirrors of the second plurality and activate the emitters of the second plurality to establish left and right eye components of the first frame of a demanded 3D image for a second viewer.

15. The apparatus of claim 14, wherein the demanded 3D image for the first viewer is the same as the demanded 3D image for the second viewer.

16. The apparatus of claim 14, wherein the demanded 3D image for the first viewer is not the same as the demanded 3D image for the second viewer.

17. The apparatus of claim 10, wherein the instructions are executable to:
    move the micro mirrors at least in part based on eye tracking of a viewer.

18. The apparatus of claim 10, wherein the plurality of pixel elements is a first plurality, and the instructions are executable to:
    move the micro mirrors and activate the emitters to establish left and right eye components of the demanded 3D image for a plurality of viewers; and
    for a second plurality of pixel elements, move the micro mirrors of the second plurality and activate the emitters of the second plurality to establish left and right eye components of the first frame of a demanded 3D image for a plurality of viewers.

* * * * *